(12) United States Patent
Sangco et al.

(10) Patent No.: US 10,303,333 B2
(45) Date of Patent: May 28, 2019

(54) MOBILE DEVICE, METHOD FOR CAMERA USER INTERFACE, AND NON-TRANSITORY COMPUTER READABLE STORAGE MEDIUM

(71) Applicant: HTC Corporation, Taoyuan (TW)

(72) Inventors: Nicole Pauline Sangco, Seattle, WA (US); Angela Kribbs Sharer, Seattle, WA (US)

(73) Assignee: HTC Corporation, Taoyuan (TW)

( * ) Notice: Subject to any disclaimer, the term of this patent is extended or adjusted under 35 U.S.C. 154(b) by 331 days.

(21) Appl. No.: 15/272,415

(22) Filed: Sep. 21, 2016

(65) Prior Publication Data
US 2018/0081502 A1    Mar. 22, 2018

(51) Int. Cl.
H04N 5/232        (2006.01)
G06F 3/0482       (2013.01)

(52) U.S. Cl.
CPC ....... *G06F 3/0482* (2013.01); *H04N 5/23216* (2013.01); *H04N 5/23245* (2013.01); *H04N 5/23293* (2013.01)

(58) Field of Classification Search
CPC .......... H04N 5/23245; H04N 5/23216; H04N 5/23293; G06F 3/0482; G06F 3/04817
See application file for complete search history.

(56) References Cited

U.S. PATENT DOCUMENTS

| | | | | |
|---|---|---|---|---|
| 2011/0050975 A1* | 3/2011 | Chung | ............... | G06F 1/1624 348/333.02 |
| 2013/0208143 A1* | 8/2013 | Chou | ................ | H04N 1/212 348/231.99 |
| 2014/0192217 A1* | 7/2014 | Kim | ................ | H04N 5/23219 348/222.1 |
| 2014/0300779 A1* | 10/2014 | Yeo | ................. | H04N 5/2351 348/234 |
| 2014/0375862 A1* | 12/2014 | Kim | ................ | H04N 5/23245 348/333.02 |
| 2016/0191793 A1* | 6/2016 | Yang | ............... | H04N 5/23222 348/207.11 |

OTHER PUBLICATIONS https://www.youtube.com/watch?v=9zNBWTQIPqc Google Camera 3.1 Review, BTechTalk, Nov. 21, 2015.*
https://www.youtube.com/watch?v=9zNBWTQIPqc Google Camera 3.1 Review, BTechTalk, Nov. 21, 2015 (Year: 2015).*

* cited by examiner

*Primary Examiner* — Lin Ye
*Assistant Examiner* — John H. Morehead, III
(74) *Attorney, Agent, or Firm* — CKC & Partners Co., LLC (57) ABSTRACT

A method includes displaying a single menu icon during operation of a camera application; detecting activation of the single menu icon; in response to detecting activation of the single menu icon, displaying a camera mode menu with a plurality of mode icons thereon, wherein the mode icons respectively correspond to different camera modes; and under a case that a first camera mode of the camera modes is active, in response to detecting activation of the single menu icon, displaying a first sub-menu of the first camera mode of the camera modes with one or more first setting icons for configuring the first camera mode.

14 Claims, 7 Drawing Sheets

MOBILE DEVICE, METHOD FOR CAMERA USER INTERFACE, AND NON-TRANSITORY COMPUTER READABLE STORAGE MEDIUM

BACKGROUND

Technical Field

The present disclosure relates to an electronic device, a method, and a non-transitory computer readable storage medium. More particularly, the present disclosure relates to a mobile device, a method for camera user interface, and a non-transitory computer readable storage medium.

Description of Related Art

With advances in electronic technology, mobile devices, such as smart phones and tablet computers, are being increasingly used.

A typical mobile device may have a camera. A user can execute a camera application in the mobile device to capture images by using a camera user interface. However, the number of camera modes and settings related to the camera application are being increased along with enhancements in the camera application. Users often find configuring the camera modes and the settings confusing.

SUMMARY

One aspect of the present disclosure is related to a method. In accordance with one embodiment of the present disclosure, the method includes displaying a single menu icon during operation of a camera application; detecting activation of the single menu icon; in response to detecting activation of the single menu icon, displaying a camera mode menu with a plurality of mode icons thereon, wherein the mode icons respectively correspond to different camera modes; and under a case that a first camera mode of the camera modes is active, in response to detecting activation of the single menu icon, displaying a first sub-menu of the first camera mode of the camera modes with one or more first setting icons for configuring the first camera mode.

In accordance with one embodiment of the present disclosure, the method further includes under a case that the first camera mode of the camera modes is active, in response to detecting activation of the single menu icon, displaying an indication icon between a first mode icon of the mode icons corresponding to the first camera mode and the first sub-menu of the first camera mode.

In accordance with one embodiment of the present disclosure, the method further includes in response to detecting activation of the single menu icon, hiding the single menu icon.

In accordance with one embodiment of the present disclosure, the method further includes displaying a configuration icon concurrently with displaying the single menu icon, and hiding the another icon concurrently with hiding the single menu icon. Under a case that the first camera mode of the camera modes is active, the another icon is for configuring the first camera mode.

In accordance with one embodiment of the present disclosure, the single menu icon is shown on a first side of a display, a capturing icon for photographing an image and/or recording a video film is shown on a second side of a display opposite to the first side, and the capturing icon is continuously shown when the camera mode menu is shown and the single menu icon is hidden.

In accordance with one embodiment of the present disclosure, under a case that the first camera mode of the camera modes is active, the camera mode menu and the first sub-menu are shown simultaneously.

In accordance with one embodiment of the present disclosure, the method further includes under a case that a second camera mode of the camera modes is active, in response to detecting activation of the single menu icon, displaying a second sub-menu of the second camera mode of the camera modes with one or more second setting icons for configuring the second camera mode.

Another aspect of the present disclosure is related to a mobile device. In accordance with one embodiment of the present disclosure, the mobile device includes a display component, a user input component, one or more processing components, memory, and one or more programs. The one or more processing components are electrically connected to the display component and the user input component. The memory is electrically connected to the one or more processing components. The one or more programs are stored in the memory and configured to be executed by the one or more processing components. The one or more programs comprise instructions for displaying, through the display component, a single menu icon during operation of a camera application; detecting, through the user input component, activation of the single menu icon; in response to detecting activation of the single menu icon, displaying, through the display component, a camera mode menu with a plurality of mode icons thereon, wherein the mode icons respectively correspond to different camera modes; and under a case that a first camera mode of the camera modes is active, in response to detecting activation of the single menu icon, displaying, through the display component, a first sub-menu of the first camera mode of the camera modes with one or more first setting icons for configuring the first camera mode.

In accordance with one embodiment of the present disclosure, the mobile device includes instructions for under a case that the first camera mode of the camera modes is active, in response to detecting activation of the single menu icon, displaying an indication icon between a first mode icon of the mode icons corresponding to the first camera mode and the first sub-menu of the first camera mode.

In accordance with one embodiment of the present disclosure, the mobile device includes instructions for in response to detecting activation of the single menu icon, hiding the single menu icon.

In accordance with one embodiment of the present disclosure, the mobile device includes instructions for displaying a configuration icon concurrently with displaying the single menu icon, and hiding the configuration icon concurrently with hiding the single menu icon. Under a case that the first camera mode of the camera modes is active, the configuration icon is for configuring the first camera mode.

In accordance with one embodiment of the present disclosure, the single menu icon is shown on a first side of a display, a capturing icon for photographing an image and/or recording a video film is shown on a second side of a display opposite to the first side, and the capturing icon is continuously shown when the camera mode menu is shown and the single menu icon is hidden.)

In accordance with one embodiment of the present disclosure, under a case that the first camera mode of the camera modes is active, the camera mode menu and the first sub-menu are shown simultaneously.

In accordance with one embodiment of the present disclosure, the mobile device includes instructions for under a case that a second camera mode of the camera modes is active, in response to detecting activation of the single menu icon, displaying a second sub-menu of the second camera mode of the camera modes with one or more second setting icons for configuring the second camera mode.

Another aspect of the present disclosure is related to a non-transitory computer readable storage medium. In accordance with one embodiment of the present disclosure, the non-transitory computer readable storage medium storing one or more programs includes instructions, which when executed, causes one or more processing components to perform operations including: displaying a single menu icon during operation of a camera application; detecting activation of the single menu icon; In response to detecting activation of the single menu icon, displaying a camera mode menu with a plurality of mode icons thereon, wherein the mode icons respectively correspond to different camera modes; and under a case that a first camera mode of the camera modes is active, in response to detecting activation of the single menu icon, displaying a first sub-menu of the first camera mode of the camera modes with one or more first setting icons for configuring the first camera mode.

In accordance with one embodiment of the present disclosure, the non-transitory computer readable storage medium includes instructions, which when executed, causes one or more processing components to perform operations including under the case that a first camera mode of the camera modes is active, in response to detecting activation of the single menu icon, displaying an indication icon between a first mode icon of the mode icons corresponding to the first camera mode and the first sub-menu of the first camera mode.

In accordance with one embodiment of the present disclosure, the non-transitory computer readable storage medium includes instructions, which when executed, causes one or more processing components to perform operations including in response to detecting activation of the single menu icon, hiding the single menu icon.

In accordance with one embodiment of the present disclosure, the non-transitory computer readable storage medium includes instructions, which when executed, causes one or more processing components to perform operations including displaying a configuration icon concurrently with displaying the single menu icon, and hiding the configuration icon concurrently with hiding the single menu icon. Under a case that the first camera mode of the camera modes is active, the configuration icon is for configuring the first camera ode.

In accordance with one embodiment of the present disclosure, the single menu icon is shown on a first side of a display, a capturing icon for photographing an image and/or recording a video film is shown on a second side of a display opposite to the first side, and the capturing icon is continuously shown when the camera mode menu is shown and the single menu icon is hidden.)

In accordance with one embodiment of the present disclosure, under a case that the first camera mode of the camera modes is active, the camera mode menu and the first sub-menu are shown simultaneously.

Through the operations of one embodiment described above, a more user-friendly camera user interface can be realized.

BRIEF DESCRIPTION OF THE DRAWINGS

The invention can be more fully understood by reading the following detailed description of the embodiments, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

One aspect of the present disclosure is related to a mobile device. In the paragraphs below, a smart phone will be taken as an example to describe details of the mobile device. However, another mobile device, such as a tablet computer and a PDA, is within the contemplated scope of the present disclosure.

Figure 1:
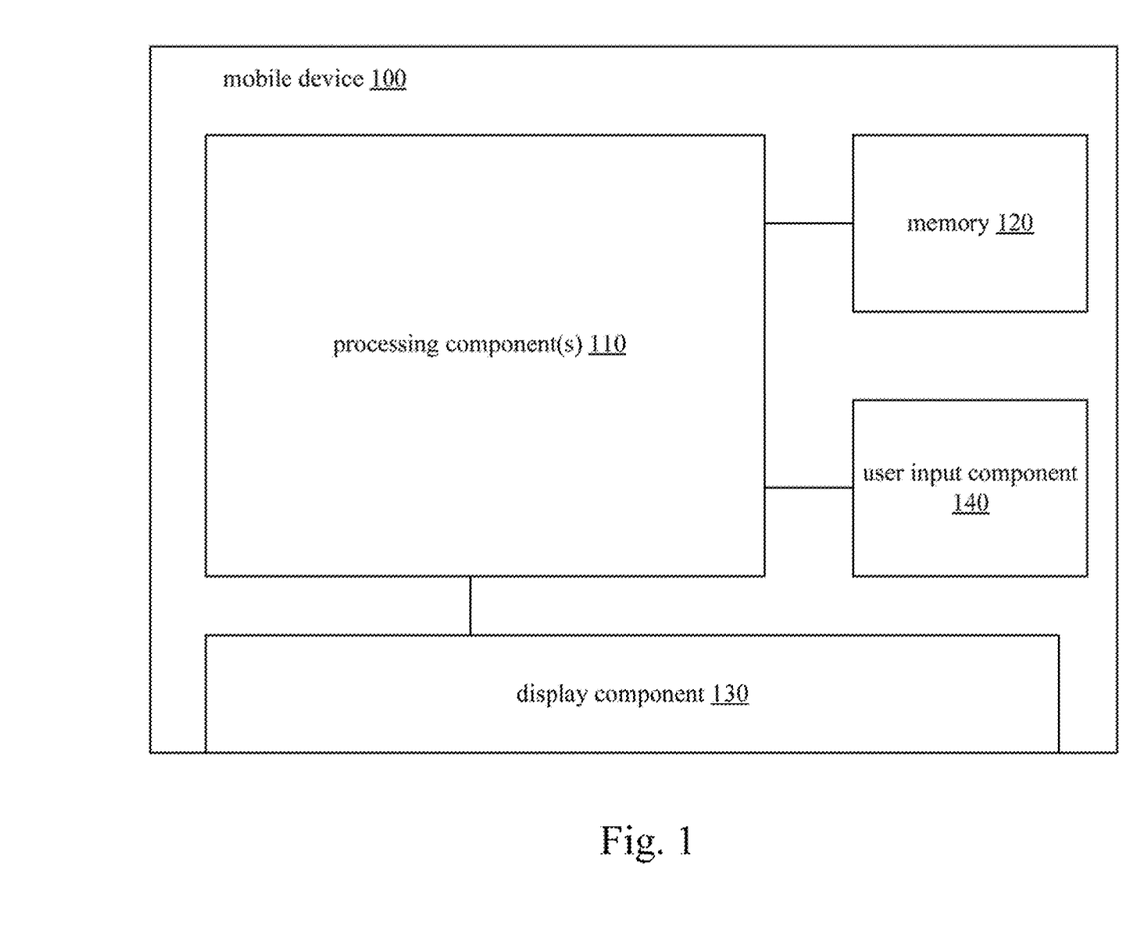
FIG. 1 is a schematic block diagram of a mobile device in accordance with one embodiment of the present disclosure.

FIG. 1 is a schematic block diagram of a mobile device 100 in accordance with one embodiment of the present disclosure. In this embodiment, the mobile device 100 includes one or more processing components 110, a memory 120, a display component 130, and a user input component 140. In this embodiment, the processing component 110 is electrically connected to the memory 120, the display component 130, and the user input component 140.

In one embodiment, the one or more processing components 110 can be realized by, for example, one or more processors, such as central processors and/or microprocessors, but are not limited in this regard. In one embodiment, the memory 120 includes one or more memory devices, each of which comprises, or a plurality of which collectively comprise a computer readable storage medium. The memory 120 may include a read-only memory (ROM), a flash memory, a floppy disk, a hard disk, an optical disc, a flash disk, a flash drive, a tape, a database accessible from a network, or any storage medium with the same functionality that can be contemplated by persons of ordinary skill in the art to which this invention pertains. The display component 130 can be realized by, for example, a display, such as a liquid crystal display, an active matrix organic light emitting display (AMOLED), or an e-paper display, but is not limited in this regard. The user input component 140 can be realized by, for example, a touch sensing module, a keyboard, or a mouse, but is not limited in this regard. In one embodiment, the display component 130 and the user input component 140 can be integrated as a touch display component, but the present disclosure is not limited to such an embodiment.

In one embodiment, the one or more processing components 110 may run or execute various software programs and/or sets of instructions stored in memory 120 to perform various functions for the mobile device 100 and to process data.

In one embodiment, when a camera application is operated, the one or more processing components 110 are configured to control the display component 120 to display a graphical user interface. The user input component 140 is configured to receive user inputs corresponding to the graphical user interface and transmit the user inputs to the one or more processing components 110, so that the one or more processing components 110 can perform operations corresponding to the user inputs. In one embodiment, the camera application has a plurality of camera modes. The camera modes include, for example, a photo mode, a Zoe camera mode, a panorama mode, a professional mode, and/or a video mode. Each of the camera modes has one or more configurations, such as an on/off state of a flash and delay timer settings. One of the camera modes may be active in the camera application. A user can set these configurations of the active camera mode through the graphical user interface.

Details of the present disclosure are described in the paragraphs below with reference to a display method in FIG. 2. However, the present disclosure is not limited to the embodiment below.

It should be noted that the display method can be applied to a mobile device having a structure that is the same as or similar to the structure of the mobile device 100 shown in FIG. 1. To simplify the description below, the embodiment shown in FIG. 1 will be used as an example to describe the display method according to an embodiment of the present disclosure. However, the present disclosure is not limited to application to the embodiment shown in FIG. 1.

It should be noted that, in some embodiments, the display method may be implemented as a computer program. When the computer program is executed by a computer, an electronic device, or the one or more processing components 110 in FIG. 1, this executing device performs the display method. The computer program can be stored in a non-transitory computer readable medium such as a ROM (read-only memory), a flash memory, a floppy disk, a hard disk, an optical disc, a flash disk, a flash drive, a tape, a database accessible from a network, or any storage medium with the same functionality that can be contemplated by persons of ordinary skill in the art to which this invention pertains.

In addition, it should be noted that in the operations of the following display method, no particular sequence is required unless otherwise specified. Moreover, the following operations also may be performed simultaneously or the execution times thereof may at least partially overlap.

Furthermore, the operations of the following display method may be added to, replaced, and/or eliminated as appropriate, in accordance with various embodiments of the present disclosure.

Figure 2:
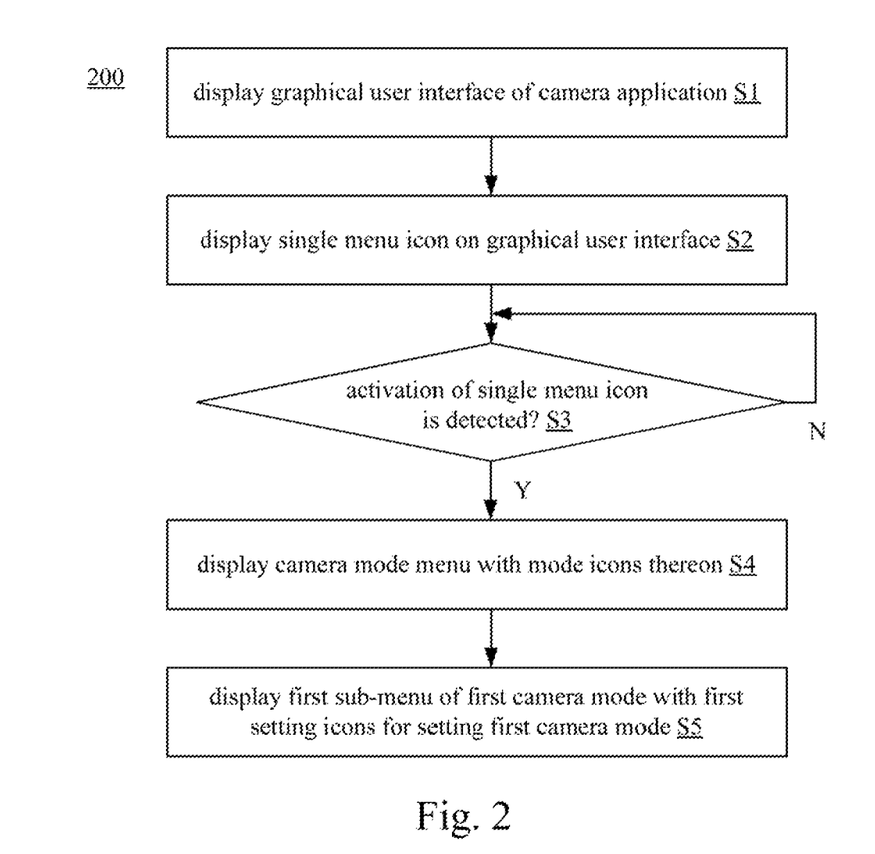
FIG. 2 is a flowchart of a display method in accordance with one embodiment of the present disclosure.

Reference is made to FIGS. 1 and 2. The display method 200 includes the operations below.

In operation S1, when a camera application is launched, the one or more processing components 110 control the display component 130 to display a graphical user interface of the camera application.

In operation S2, during operation of the camera application, the one or more processing components 110 control the display component 130 to display a single menu icon on the graphical user interface of the camera application.

In one embodiment, the one or more processing components 110 may control the display component 130 to display a capturing icon for photographing an image and/or recording a video film on the graphical user interface of the camera application. In one embodiment, the single menu icon may be displayed (shown) on a first side of the display component 130, and the capturing icon may be displayed on a second side of the display component 130, which is opposite to the first side.

In one embodiment, a configuration icon, such as a flash icon for turning on/off a flash and an HDR (high dynamic range) icon for turning on/off a HDR function, may be displayed on the first side and/or the second side of the display component 130. In one embodiment, the configuration icon is for configuring one of the camera modes that is active. For example, under a case that the photo mode is active, the configuration icon may be a flash icon for configuring the on/off state of a flash of the photo mode.

In one embodiment, a configuration icon, such as a photograph icon for displaying a previously captured photograph, a video icon for activating a video mode, and a switching icon for switching between the front camera and the back camera, may be displayed on the first side and/or the second side of the display component 130.

In operation S3, the one or more processing components 110 detect activation of the single menu icon through the user input component 140. If activation of the single menu icon is detected, operation S4 is performed. If activation of the single menu icon is not detected, the one or more processing components 110 continuously detect activation of the single menu icon.

In one embodiment, the activation of the single menu icon may be a finger contact with the display component 130 at a predefined location corresponding to the single menu icon. In an alternative embodiment, the activation of the single menu icon may be a mouse click at a predefined location corresponding to the single menu icon. In one embodiment, the activation of the single menu icon may be a swipe from an edge of the display component 130. The activation of the single menu icon is not limited to the embodiments described herein.

In operation S4, in response to detecting activation of the single menu icon, the one or more processing components 110 control the display component 130 to display a camera mode menu with a plurality of mode icons thereon. In one embodiment, the mode icons respectively correspond to different camera modes.

In one embodiment, in response to detecting activation of the single menu icon and/or displaying of the camera mode menu, the one or more processing components 110 control the display component 130 to hide the single menu icon and/or a configuration icon displayed on the first side of the display component 130. In one embodiment, the hidden configuration icon is for configuring the active camera mode. In some embodiments, all of the icons for configuring the active camera mode, which are displayed concurrently with the single menu icon, are hidden concurrently with the single menu icon.

In one embodiment, the capturing icon and/or a configuration icon displayed on the second side of the display component 130 may be continuously displayed when the camera mode menu is displayed and the single menu icon is hidden.

In operation S5, under a case that the first camera mode of the camera modes is active, in response to detecting activation of the single menu icon, the one or more processing components 110 control the display component 130 to display a first sub-menu of the first camera mode with one or more first setting icons for configuring the first camera mode.

In one embodiment, the first setting icons include, for example, a timer icon for turning on/off a camera timer and a size icon for adjusting sizes of photographs. In one embodiment, all of the icons for configuring the first camera mode are displayed on the first sub-menu of the first camera mode.

In one embodiment, under a case that a first camera mode of the camera modes is active, the camera mode menu and the first sub-menu are displayed simultaneously.

In one embodiment, under a case that a first camera mode of the camera modes is active, in response to detecting activation of the single menu icon, the one or mare processing components 110 control the display component 130 to display an indication icon between a first mode icon of the mode icons corresponding to the first camera mode and the first sub-menu of the first camera mode. In one embodiment, the indication icon points in a direction from the first mode icon to the first sub-menu. In one embodiment, the indication icon may be an arrow.

In one embodiment, under a case that a first camera mode of the camera modes is active, the one or more processing components 110 control the display component 130 to display the first mode icon corresponding to the activated first camera mode with a first background color, and display the other mode icons corresponding to the other non-active camera modes with a second background color different than the first background color. In addition, in one embodiment, the one or more processing components 110 control the display component 130 to display the first sub-menu of the first camera mode with a background color substantially identical to the first background color. For example, the background colors of the first mode icon and the first sub-menu are golden, and the background colors of the other non-active modes are gray. In such a case, the indication icon may be omitted.

In one embodiment, under a case that a first camera mode of the camera modes is active and the camera mode menu and the first sub-menu are displayed, the one or more processing components 110 control the display component 130 to only display the first setting icons and refrain from displaying icons for configuring other camera modes that are inactive.

Through the operations described above, the hierarchy relationship between the camera modes and the setting icons is clear. In addition, all of the camera modes and settings can be accessible from a single entry icon. Moreover, the setting icons for the active camera mode can be immediately visible when the camera mode menu is opened. Thus, a more user-friendly camera user interface can be realized.

Additionally, since the setting icons corresponding to the active camera mode are only visible setting icons when the camera mode menu is opened, they do not clutter the viewfinder.

In one embodiment of the present disclosure, when the camera mode menu and the first sub-menu are displayed, a user can activate a second camera mode and deactivate the first camera mode through the user input component 140. In one embodiment, a user can activate the second camera mode by a finger touch or mouse click at a predefined location corresponding to a second mode icon of the mode icons, but another manner of activation may also be used.

In one embodiment, under a case that a second camera mode of the camera modes is active, in response to detecting activation of the single menu icon, the one or more processing components 110 control the display component 130 to display a second sub-menu of the second camera mode of the camera modes with one or more second setting icons for configuring the second camera mode. In one embodiment, all of the icons for configuring the second camera mode are displayed on the second sub-menu of the second camera mode. In one embodiment, the one or more second setting icons are at least partially different from the one or more first setting icons. For example, the first setting icons may include a timer icon and a size icon, and the one or more second setting icons may include a makeup icon for automatically modifying the captured photograph. However, in a different embodiment, the one or more second setting icons are the same as the one or more first setting icons. For example, the first setting icons may include a timer icon and a size icon for configuring the first camera mode, and the one or more second setting icons may also include a timer icon and a size icon for configuring the second camera mode.

In one embodiment, under a case that a second camera mode of the camera modes active and the camera mode menu is displayed, the one or more processing components 110 control the display component 130 to hide the first sub-menu and the one or more first setting icons.

In one embodiment, under a case that a second camera mode of the camera modes is active and the camera mode menu and the second sub-menu are displayed, the one or more processing components 110 control the display component 130 to display an indication icon between a second mode icon of the mode icons corresponding to the selected second camera mode and the second sub-menu of the second camera mode. In one embodiment, the indication icon points in a direction from the second mode icon to the second sub-menu.

In one embodiment, under a case that a second camera mode of the camera modes is active, the one or more processing components 110 control the display component 130 to display the second mode icon corresponding to the activated second camera mode with a first background color, and display the other mode icons corresponding to the other non-active camera modes with a second background color different than the first background color. In addition, in one embodiment, the one or more processing components 110 control the display component 130 to display the second sub-menu of the second camera mode with a background color substantially identical to the first background color. For example, the background colors of the second mode icon and the second sub-menu are golden, and the background colors of the other non-active modes are gray. In such a case, the indication icon may be omitted.

To allow the disclosure to be more fully understood, an illustrative example is described in the paragraphs below, but the present disclosure is not limited to the example below.

Figure 3A:
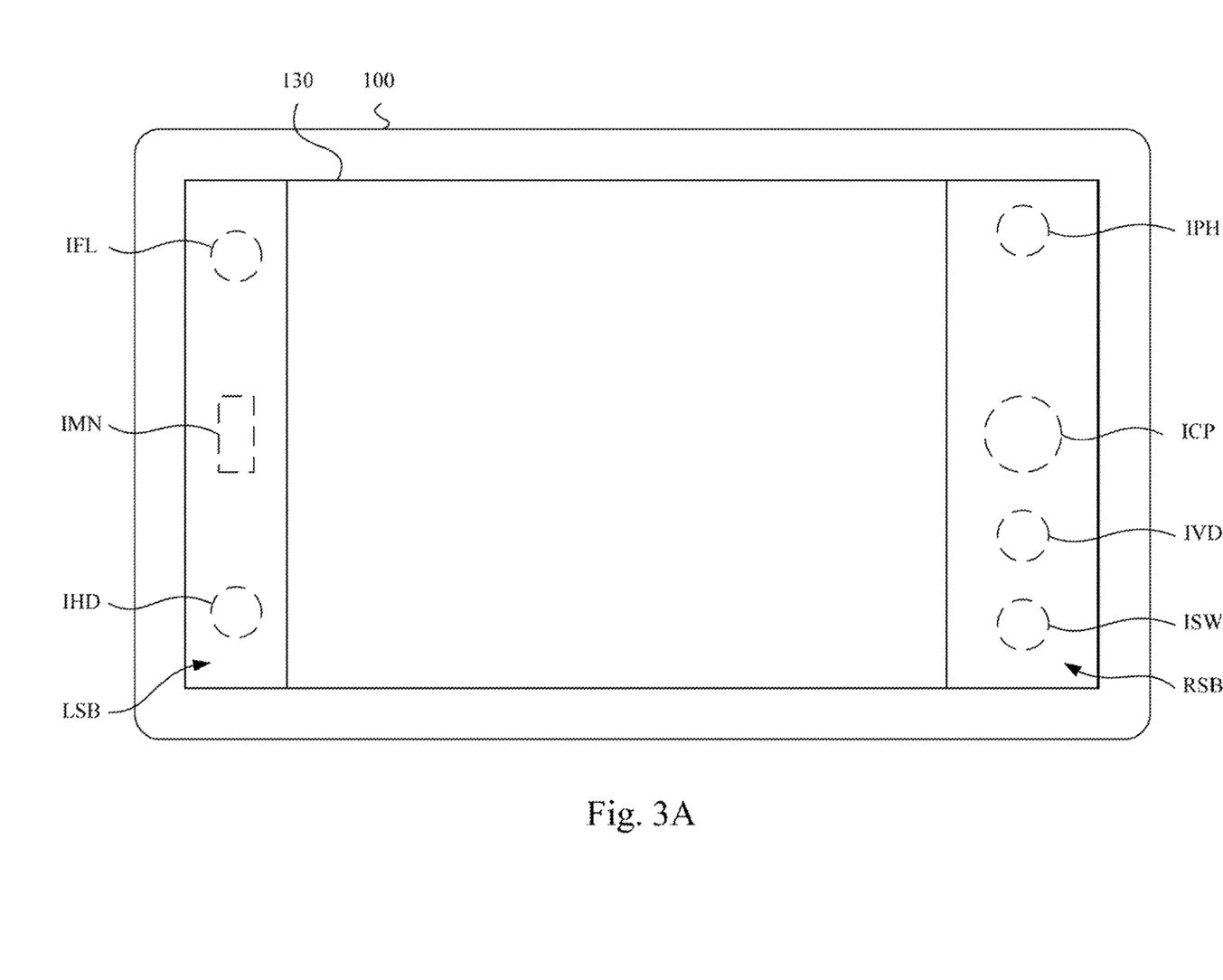
FIGS. 3A-3C illustrate an illustrative example of a display method in accordance with one embodiment of the present disclosure.
Figure 3B:
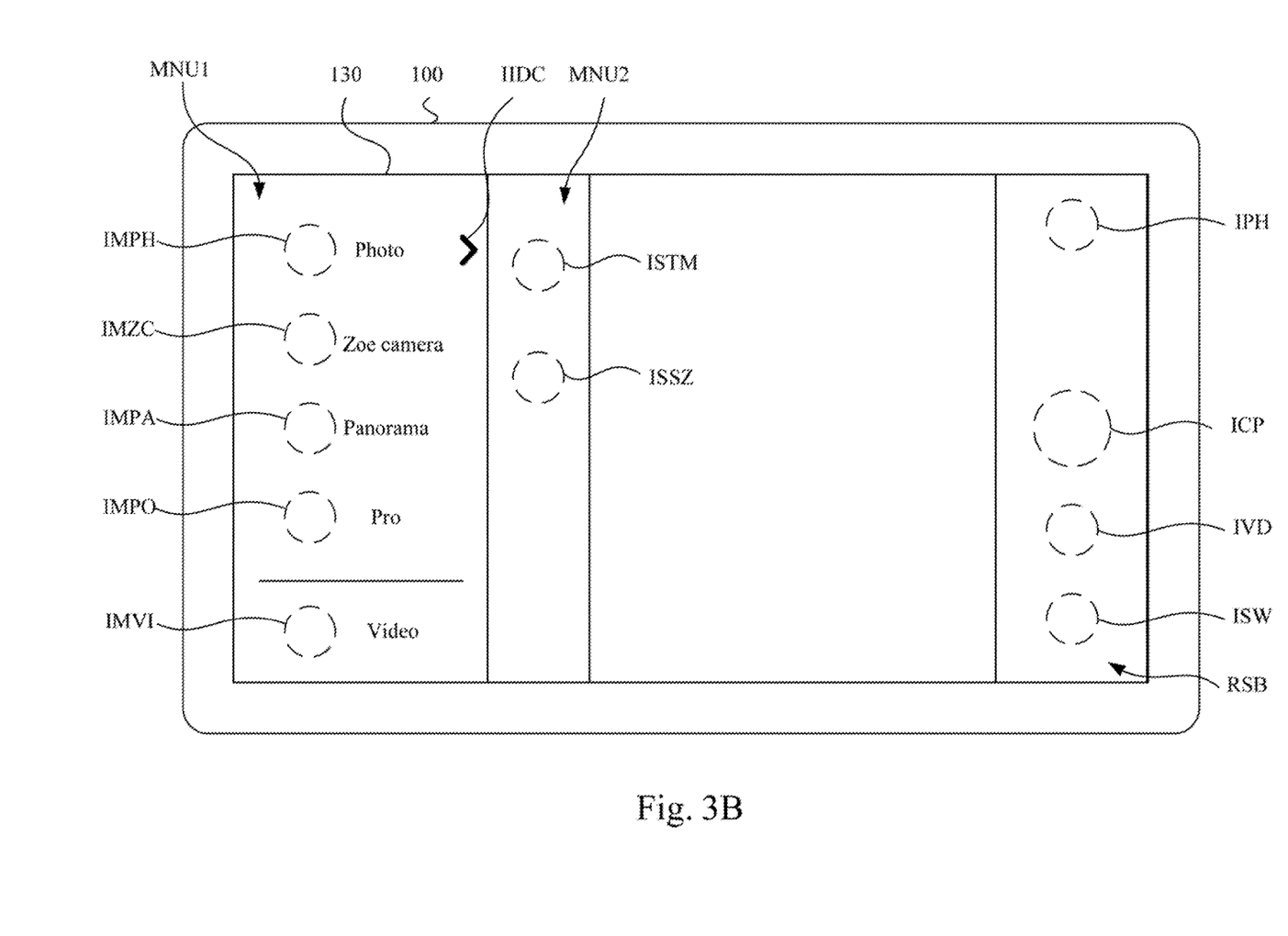
Figure 3C:
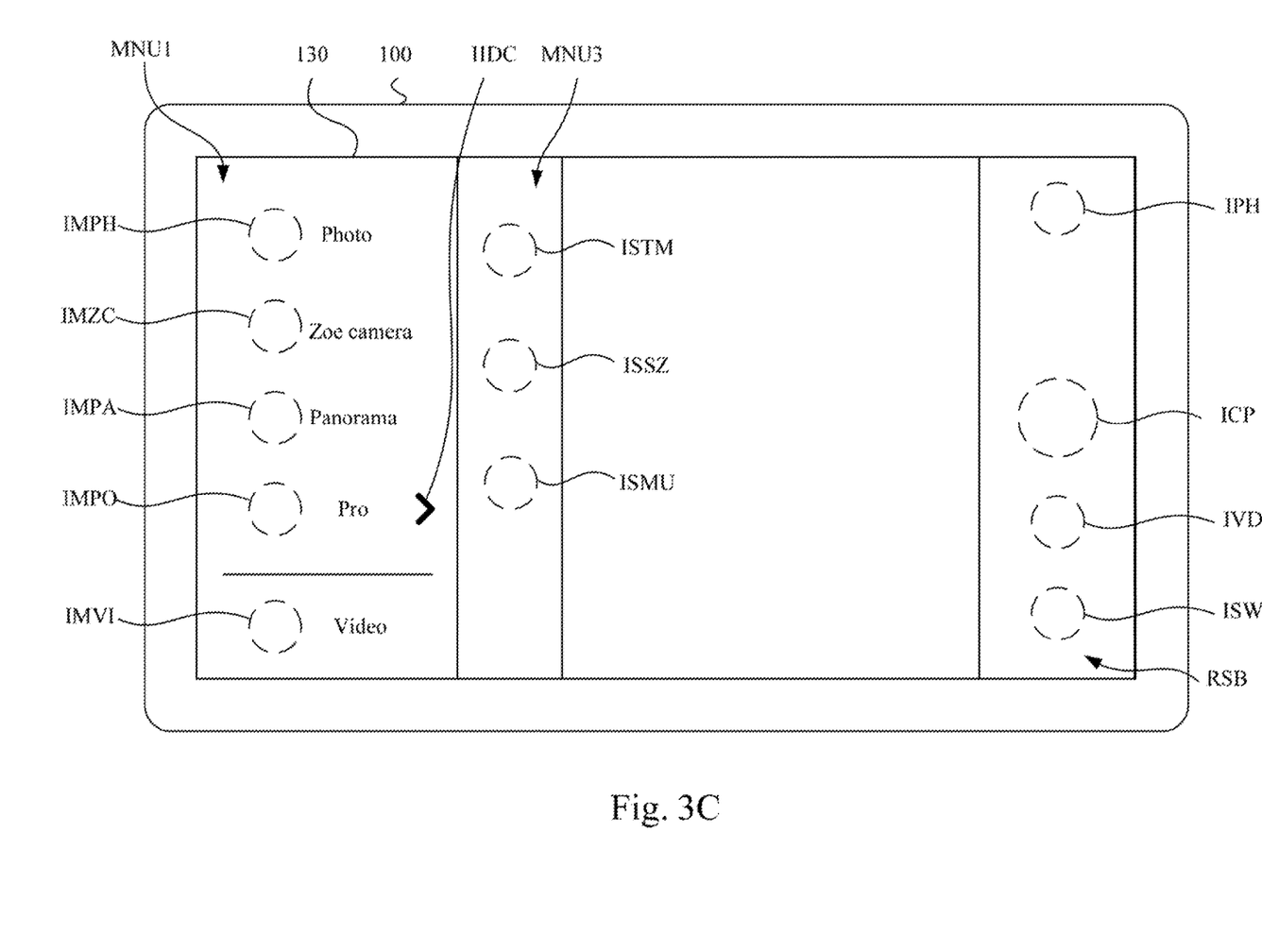

Reference is made to FIGS. 3A-3C. In this illustrative example, a graphical user interface of a camera application is displayed on the display component 130 of the mobile device 100. In FIG. 3A, the single menu icon IMN, the flash icon IFL, and the HDR icon IHD are displayed on the left sidebar LSB, and the photograph icon IPH, the capturing icon ICP, the video icon IVD, and the switching icon ISW are displayed on the right sidebar RSB. When a user touches the display component 130 at a location corresponding to the single menu icon IMN or swipe from the left side of the display component 130, the mode menu MNU1 is opened.

In FIG. 3B, the mode menu MNU1 is opened and displayed on the left side of the display component 130. The single menu icon IMN, the flash icon IFL, and the HDR icon IHS previously displayed on the left side of the display component 130 are now hidden. The mode icons IMPH, IMZC, IMPA, IMPO, IMVI respectively corresponding to the photo mode, the Zoe camera mode, the panorama mode, the professional mode, and the video mode are displayed on the mode menu MNU1.

In the embodiment in FIG. 3B, the photo mode is active. The sub-menu MNU2 of the photo mode is displayed beside the mode menu MNU1. In addition, an indication icon IIDC is displayed and points in a direction from the icon IMPH to the sub-menu MNU2, to indicate that the sub-menu MNU2 belongs to the photo mode. The timer icon ISTM and the size icon ISSZ are displayed on the sub-menu MNU2. A user can directly adjust the parameters of the photo mode by touching the timer icon ISTM and the size icon ISSZ.

In FIG. 3C, a user may activate the professional mode and deactivate the photo mode by touching the display component 130 at a location corresponding to the icon IMPO.

Refer to FIG. 3C in conjunction with FIG. 3B, in response to the activation of the professional mode, the sub-menu MNU2 of the photo mode is replaced by the sub-menu MNU3 of the professional mode. In addition, the indication icon IIDC is moved to a location corresponding to the icon IMPO and pointing to the sub-menu MNU3. That is, the indication icon IIDC points in a direction from the icon IMPO to the sub-menu MNU3 to indicate that the sub-menu MNU3 belongs to the professional mode. In addition to the timer icon ISTM and the size icon ISSZ, the makeup icon ISMU is also displayed on the sub-menu MNU3. A user can adjust the parameters of the professional mode by touching the timer icon ISTM, the size icon ISSZ, and the makeup icon ISMU.

In one embodiment, in response to the activation of the professional mode, the mode menu MNU1 and the sub-menu MNU3 are hidden immediately. At this time, the settings of the professional mode can be identical to or correspond to the setting in previous time using the professional mode, for providing a faster capturing experience. However, the user also can be able to set the capturing parameter again by touching the single menu icon IMN shown in FIG. 3A.

Figure 4A:
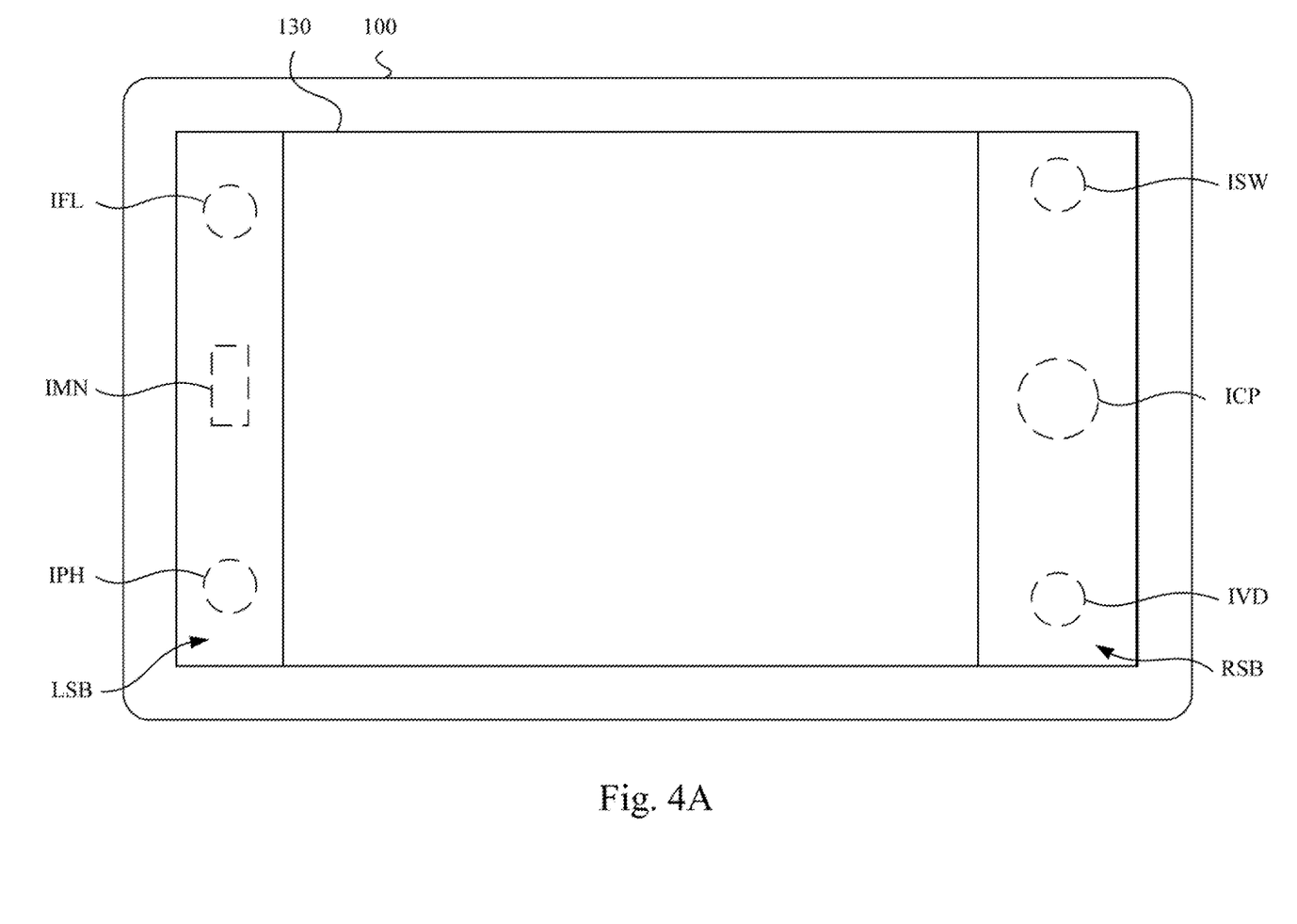
FIGS. 4A-4B illustrate another illustrative example of a display method in accordance with one embodiment of the present disclosure.
Figure 4B:
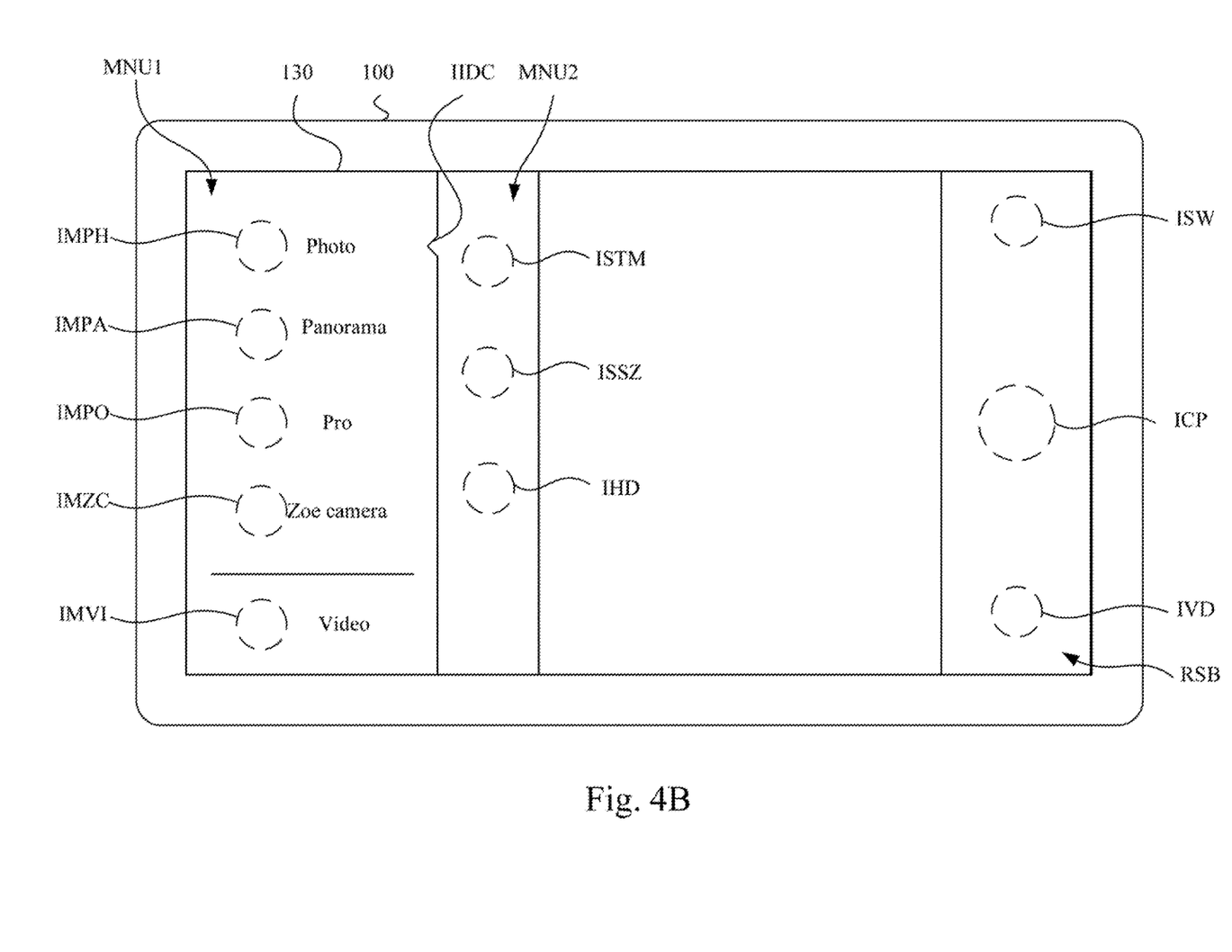

Another illustrative example is described with reference to FIGS. 4A-4B. This illustrative example is substantially identical to the illustrative example shown in FIGS. 3A-3C, and a description of many aspects that are similar will not be repeated. In this illustrative example, the icon IHD is displayed on the sub-menu MNU2 of the photo mode, instead of being displayed on the left sidebar LSB. In addition, the photograph icon IPH is displayed on the left side bar LSB, instead of being displayed on the right sidebar RSB. Moreover, the indication icon IIDC in this illustrative example is different from the indication icon IIDC in the illustrative example shown in FIGS. 3A-3C.

Although the present invention has been described in considerable detail with reference to certain embodiments thereof, other embodiments are possible. Therefore, the scope of the appended claims should not be limited to the description of the embodiments contained herein.

What is claimed is:
1. A method comprising:
   displaying a single menu icon during operation of a camera application;
   detecting activation of the single menu icon;
   in response to detecting activation of the single menu icon, displaying a camera mode menu with a plurality of mode icons thereon, wherein the mode icons respectively correspond to different camera modes;
   under a case that a first camera mode of the camera modes is active, in response to detecting activation of the single menu icon, displaying a first sub-menu of the first camera mode of the camera modes with one or more first setting icons for configuring the first camera mode; and
   under a case that the first camera mode of the camera modes is active, in response to detecting activation of the single menu icon, displaying an indication icon between a first mode icon of the mode icons corresponding to the first camera mode and the first sub-menu of the first camera mode,
   wherein the single menu icon is shown on a first side of a display, a capturing icon for photographing an image and/or recording a video film is shown on a second side of the display opposite to the first side, and the cap- turing icon is continuously shown without changing grey levels of the capturing icon when the camera mode menu is shown.

2. The method as claimed in claim 1 further comprising:
in response to detecting activation of the single menu icon, hiding the single menu icon.

3. The method as claimed in claim 2 further comprising:
displaying a configuration icon concurrently when displaying the single menu icon; and
hiding the configuration icon concurrently when hiding the single menu icon;
wherein under a case that the first camera mode of the camera modes is active, the configuration icon is for configuring the first camera mode.

4. The method as claimed in claim 1, wherein under a case that the first camera mode of the camera modes is active, the camera mode menu and the first sub-menu are shown simultaneously.

5. The method as claimed in claim 1 further comprising:
under a case that a second camera mode of the camera modes is active, in response to detecting activation of the single menu icon, displaying a second sub-menu of the second camera mode of the camera modes with one or more second setting icons for configuring the second camera mode.

6. A mobile device comprising:
a display component;
a user input component:
one or more processing components, electrically connected to the display component and the user input component;
memory electrically connected to the one or more processing components; and
one or more programs, wherein the one or more programs are stored in the memory and configured to be executed by the one or more processing components, the one or more programs comprising instructions for:
displaying, through the display component, a single menu icon during operation of a camera application;
detecting, through the user input component, activation of the single menu icon;
in response to detecting activation of the single menu icon, displaying, through the display component, a camera mode menu with a plurality of mode icons thereon, wherein the mode icons respectively correspond to different camera modes;
under a case that a first camera mode of the camera modes is active, in response to detecting activation of the single menu icon, displaying, through the display component, a first sub-menu of the first camera mode of the camera modes with one or more first setting icons for configuring the first camera mode; and
under a case that the first camera mode of the camera modes is active, in response to detecting activation of the single menu icon, displaying an indication icon between a first mode icon of the mode icons corresponding to the first camera mode and the first sub-menu of the first camera mode,
wherein the single menu icon is shown on a first side of a display, a capturing icon for photographing an image and/or recording a video film is shown on a second side of the display opposite to the first side, and the capturing icon is continuously shown without changing grey levels of the capturing icon when the camera mode menu is shown.

7. The mobile device as claimed in claim 6, comprising instructions for:
in response to detecting activation of the single menu icon, hiding the single menu icon.

8. The mobile device as claimed in claim 7, comprising instructions for:
displaying a configuration icon concurrently when displaying the single menu icon; and
hiding the configuration icon concurrently when hiding the single menu icon;
wherein under a case that the first camera mode of the camera modes is active, the configuration icon is for configuring the first camera mode.

9. The mobile device as claimed in claim 6, wherein under a case that the first camera mode of the camera modes is active, the camera mode menu and the first sub-menu are shown simultaneously.

10. The mobile device as claimed in claim 6, comprising instructions for:
under a case that a second camera mode of the camera modes is active, in response to detecting activation of the single menu icon, displaying a second sub-menu of the second camera mode of the camera modes with one or more second setting icons for configuring the second camera mode.

11. A non-transitory computer readable storage medium storing one or more programs comprising instructions, which when executed, causes one or more processing components to perform operations comprising:
displaying a single menu icon during operation of a camera application;
detecting activation of the single menu icon;
in response to detecting activation of the single menu icon, displaying a camera mode menu with a plurality of mode icons thereon, wherein the mode icons respectively correspond to different camera modes;
under a case that a first camera mode of the camera modes is active, in response to detecting activation of the single menu icon, displaying a first sub-menu of the first camera mode of the camera modes with one or more first setting icons for configuring the first camera mode; and
under a case that the first camera mode of the camera modes is active, in response to detecting activation of the single menu icon, displaying an indication icon between a first mode icon of the mode icons corresponding to the first camera mode and the first sub-menu of the first camera mode,
wherein the single menu icon is shown on a first side of a display, a capturing icon for photographing an image and/or recording a video film is shown on a second side of the display opposite to the first side, and the capturing icon is continuously shown without changing grey levels of the capturing icon when the camera mode menu is shown.

12. The non-transitory computer readable storage medium as claimed in claim 11 comprising instructions, which when executed, causes the one or more processing components to perform operations comprising:
in response to detecting activation of the single menu icon, hiding the single menu icon.

13. The non-transitory computer readable storage medium as claimed in claim 12 comprising instructions, which when executed, causes the one or more processing components to perform operations comprising:
displaying a configuration icon concurrently when displaying the single menu icon; and
hiding the configuration icon concurrently when hiding the single menu icon;

wherein under a case that the first camera mode of the camera modes is active, the configuration icon is for configuring the first camera mode.

14. The non-transitory computer readable storage medium as claimed in claim 11, wherein under a case that the first camera mode of the camera modes is active, the camera mode menu and the first sub-menu are shown simultaneously.

* * * * *